United States Patent
Carlsson et al.

(10) Patent No.: US 9,762,799 B2
(45) Date of Patent: Sep. 12, 2017

(54) RECEIVED VIDEO STABILIZATION

(75) Inventors: Pontus Carlsson, Bromma (SE); Andrei Jefremov, Jarfalla (SE); Sergey Sablin, Bromma (SE); David Zhao, Solna (SE)

(73) Assignee: Skype, Dublin (IE)

(*) Notice: Subject to any disclaimer, the term of this patent is extended or adjusted under 35 U.S.C. 154(b) by 0 days.

(21) Appl. No.: 13/339,879

(22) Filed: Dec. 29, 2011

(65) Prior Publication Data
US 2013/0093906 A1 Apr. 18, 2013

(30) Foreign Application Priority Data
Oct. 14, 2011 (GB) .................................. 1117774.8

(51) Int. Cl.
H04N 5/232 (2006.01)

(52) U.S. Cl.
CPC ..... *H04N 5/23248* (2013.01); *H04N 5/23258* (2013.01); *H04N 5/23267* (2013.01)

(58) Field of Classification Search
CPC .......... H04N 5/23248; H04N 5/23258; H04N 5/23267
USPC ................. 348/208.2, 208.3, 208.7, 208.99
See application file for complete search history.

(56) References Cited

U.S. PATENT DOCUMENTS

| | | | |
|---|---|---|---|
| 4,864,409 A | 9/1989 | Platte et al. | |
| 4,959,725 A | 9/1990 | Mandle | |
| 5,438,361 A | 8/1995 | Coleman | |
| 6,982,746 B1 | 1/2006 | Kawahara et al. | |
| 7,010,045 B2 | 3/2006 | Lee | |
| 8,358,345 B1 | 1/2013 | Fiore et al. | |
| 8,711,233 B2 | 4/2014 | Jefremov | |
| 8,723,966 B2 | 5/2014 | Owen et al. | |
| 9,635,256 B2 | 4/2017 | Owen et al. | |
| 2002/0118761 A1* | 8/2002 | Lee | 375/240.27 |
| 2004/0001147 A1 | 1/2004 | Vella et al. | |
| 2005/0179784 A1 | 8/2005 | Qi | |
| 2006/0140603 A1 | 6/2006 | Kurata et al. | |
| 2006/0185431 A1 | 8/2006 | Birecki et al. | |
| 2006/0210175 A1 | 9/2006 | Huang et al. | |
| 2007/0122129 A1 | 5/2007 | Sakamoto et al. | |
| 2007/0147706 A1 | 6/2007 | Sasaki et al. | |

(Continued)

FOREIGN PATENT DOCUMENTS

| | | |
|---|---|---|
| CN | 1330493 | 1/2002 |
| CN | 1819626 | 6/2006 |

(Continued)

OTHER PUBLICATIONS

"Combined Search Report and Examination Report", British Application No. 1117774.8, (Apr. 15, 2013), 5 pages.

(Continued)

Primary Examiner — Shahbaz Nazrul

(57) ABSTRACT

Method, device and computer program product for stabilizing a received video signal. A plurality of frames of the video signal is captured using a camera. The video signal is transmitted as an encoded bit stream. Displacement of the camera between successive frames is determined from a motion indication in the bit stream. The determined displacement is used to compensate for motion in the video signal between successive frames caused by the motion of the camera, to thereby stabilize the video signal.

19 Claims, 3 Drawing Sheets

(56) References Cited

U.S. PATENT DOCUMENTS

| | | | |
|---|---|---|---|
| 2007/0285521 A1* | 12/2007 | Watanabe et al. | 348/208.99 |
| 2007/0296861 A1 | 12/2007 | Evans et al. | |
| 2008/0004073 A1 | 1/2008 | John et al. | |
| 2008/0012945 A1 | 1/2008 | Uenaka | |
| 2008/0136931 A1 | 6/2008 | Hatanaka et al. | |
| 2008/0246848 A1* | 10/2008 | Tsubaki et al. | 348/208.4 |
| 2009/0102931 A1 | 4/2009 | Yoshikawa et al. | |
| 2009/0135264 A1 | 5/2009 | John | |
| 2009/0231450 A1 | 9/2009 | Tanaka et al. | |
| 2009/0309984 A1 | 12/2009 | Bourgain et al. | |
| 2009/0322896 A1 | 12/2009 | Yoshizumi | |
| 2010/0033588 A1 | 2/2010 | Thorn | |
| 2010/0060751 A1 | 3/2010 | Pinto et al. | |
| 2010/0220215 A1 | 9/2010 | Rubinstein et al. | |
| 2010/0295961 A1 | 11/2010 | Terauchi | |
| 2010/0328472 A1 | 12/2010 | Steinberg et al. | |
| 2011/0007175 A1 | 1/2011 | Fujita et al. | |
| 2011/0141219 A1 | 6/2011 | Yeh | |
| 2011/0228112 A1 | 9/2011 | Kaheel et al. | |
| 2012/0069203 A1 | 3/2012 | Voss et al. | |
| 2012/0081558 A1* | 4/2012 | Ogura | 348/208.6 |
| 2012/0162449 A1 | 6/2012 | Braun et al. | |
| 2012/0262587 A1* | 10/2012 | Schmid | 348/208.4 |
| 2012/0307086 A1 | 12/2012 | Jefremov et al. | |
| 2013/0076921 A1 | 3/2013 | Owen | |
| 2014/0211028 A1 | 7/2014 | Jefremov | |
| 2014/0211032 A1 | 7/2014 | Owen | |

FOREIGN PATENT DOCUMENTS

| | | |
|---|---|---|
| CN | 101065964 | 10/2007 |
| CN | 101411181 | 4/2009 |
| CN | 101897174 | 11/2010 |
| DE | 102009058597 | 6/2011 |
| EP | 0520741 | 12/1992 |
| EP | 1377040 | 1/2004 |
| EP | 1679884 | 7/2006 |
| EP | 1978731 | 10/2008 |
| EP | 2028842 | 2/2009 |
| EP | 2219364 | 8/2010 |
| JP | 11098420 | 4/1999 |
| JP | 2003234946 | 8/2003 |
| JP | 2005236662 | 9/2005 |
| JP | 2007522772 | 8/2007 |
| JP | 2009532990 | 9/2009 |
| KR | 20020001087 | 2/2002 |
| WO | WO-2010116366 | 10/2010 |
| WO | WO-2013056202 | 4/2013 |

OTHER PUBLICATIONS

"International Search Report and Written Opinion", Application No. PCT/US2012/060167, (Jan. 7, 2013), 19 pages.
"Foreign Office Action", GB Application No. 1117774.8, Jul. 8, 2014, 3 pages.
"Foreign Office Action", CN Application No. 201210388814.8, Apr. 1, 2015, 14 pages.
"Foreign Office Action", EP Application No. 12788338.7, May 15, 2015, 4 pages.
"Non-Final Office Action", U.S. Appl. No. 14/230,767, Feb. 17, 2016, 12 pages.
"Non-Final Office Action", U.S. Appl. No. 14/242,512, Mar. 14, 2016, 13 pages.
"Final Office Action", U.S. Appl. No. 14/242,512, Jul. 15, 2016, 16 pages.
"Foreign Notice of Allowance", CN Application No. 201210363053.0, Apr. 27, 2016, 4 pages.
"Foreign Office Action", CN Application No. 201210388814.8, Jun. 3, 2016, 6 pages.
"Extended European Search Report", EP Application No. 16165181.5, Aug. 18, 2016, 7 pages.
"Extended European Search Report", EP Application No. 16165182.3, Aug. 18, 2016, 6 pages.
"Foreign Notice of Allowance", CN Application No. 201210388814.8, Sep. 7, 2016, 4 pages.
"Foreign Office Action", CN Application No. 201280026334.5, Oct. 21, 2016, 8 pages.
"Foreign Office Action", JP Application No. 2014-535968, Sep. 27, 2016, 12 pages.
"Notice of Allowance", U.S. Appl. No. 14/230,767, Sep. 22, 2016, 10 pages.
"Foreign Office Action", CN Application No. 201210388814.8, Dec. 8, 2015, 14 pages.
"Foreign Office Action", EP Application No. 12788338.7, Dec. 23, 2015, 4 pages.
"Corrected Notice of Allowance", U.S. Appl. No. 14/230,767, dated Nov. 25, 2016, 2 pages.
"Final Office Action", U.S. Appl. No. 13/307,800, dated Jul. 5, 2013, 15 pages.
"Final Office Action", U.S. Appl. No. 14/230,767, dated Oct. 16, 2015, 13 pages.
"Final Office Action", U.S. Appl. No. 14/230,767, dated Dec. 8, 2014, 14 pages.
"Foreign Notice of Allowance", CN Application No. 201280026334.5, dated Jan. 3, 2017, 4 pages.
"Foreign Office Action", CN Application No. 20120363053.0, dated Sep. 29, 2014, 26 pages.
"Foreign Office Action", CN Application No. 201210363053.0, dated Jun. 17, 2015, 7 pages.
"Foreign Office Action", CN Application No. 201210363053.0, dated Sep. 29, 2014, 21 pages.
"Foreign Office Action", CN Application No. 201210363053.0, dated Nov. 23, 2015, 8 pages.
"Foreign Office Action", CN Application No. 201280026334.5, dated Mar. 29, 2016, 21 pages.
"Foreign Office Action", EP Application No. 12725720.2, dated Nov. 12, 2015, 4 pages.
"Foreign Office Action", GB Application No. 1109071.9, dated Nov. 14, 2016, 4 pages.
"International Search Report and Written Opinion", Application No. PCT/US2012/057402, dated Jan. 25, 2013, 15 pages.
"International Search Report and Written Opinion", Application No. PCT/EP2012/060315, dated Jan. 17, 2013, 19 pages.
"Non-Final Office Action", U.S. Appl. No. 13/296,941, dated Jun. 6, 2013, 15 pages.
"Non-Final Office Action", U.S. Appl. No. 13/307,800, dated Nov. 26, 2012, 13 pages.
"Non-Final Office Action", U.S. Appl. No. 14/230,767, dated Apr. 7, 2015, 15 pages.
"Non-Final Office Action", U.S. Appl. No. 14/230,767, dated May 29, 2014, 11 pages.
"Notice of Allowance", U.S. Appl. No. 13/296,941, dated Dec. 10, 2013, 21 pages.
"Notice of Allowance", U.S. Appl. No. 13/307,800, dated Nov. 29, 2013, 8 pages.
"Partial International Search Report", Application No. PCT/EP2012/060315, dated Aug. 28, 2012, 5 pages.
"Restriction Requirement", U.S. Appl. No. 13/296,941, dated Apr. 25, 2013, 6 pages.
"Restriction Requirement", U.S. Appl. No. 14/242,512, dated Dec. 21, 2015, 6 pages.
"Search Report", GB Application No. 1109071.9, dated Nov. 5, 2012, 4 pages.
Chen,"SaVE: Sensor-assisted Motion Estimation for Efficient H.264/AVC Video Encoding", MM '09, (Oct. 19-24, 2009), Beijing, China, Oct. 19, 2009, 10 pages.
Drahansky,"Accelerometer Based Digital Video Stabilization for General Security Surveillance Systems", International Journal of Security and its Applications, vol. 1, No. 1, 1-10, Jan. 2010, 10 pages.
Hong, "SenseCoding: Accelerometer-Assisted Motion Estimation for Efficient Video Encoding", Proceedings of the 2008 ACM International Conference on Multimedia with Co-Located Symposium & Workshops: Area '08, Communicability ms '08, HCC '08,

(56) References Cited

OTHER PUBLICATIONS

MIR '08, MS'08, SAME '08, SRMC '08, TVS '08, VNBA '08: Vancouver, BC, Canada, Oct. 27-31, 2008, XP0079186, Oct. 26, 2008, pp. 749-752.
Karpenko, "Digital Video Stabilization and Rolling Shutter Correction using Gyroscopes", Stanford Tech Report CTSR 2011-03, Mar. 2011, 7 pages.
Lin, "Using Sensors for Efficient Video Coding in Hand-Held Devices", Stanford University, Nov. 12, 2010, 5 page.
Yang, "Online Video Stabilization Based on Particle Filters", Image Processing, 2006 IEEE International Conference (Oct. 8-11, 2006), Oct. 8, 2006, 4 pages.
"Examiner's Answer to Appeal Brief", U.S. Appl. No. 14/242,512, dated May 4, 2017.
"Foreign Notice of Allowance", JP Application No. 2014-535968, dated Feb. 28, 2017, 4 pages.

\* cited by examiner

RECEIVED VIDEO STABILIZATION

RELATED APPLICATION

This application claims priority under 35 U.S.C. §119 or 365 to Great Britain, Application No. GB1117774.8, filed Oct. 14, 2011. The entire teachings of the above application are incorporated herein by reference.

TECHNICAL FIELD

The present invention relates to stabilization of a video signal. In particular, the present invention relates to capturing frames of a video signal using a camera and compensating for motion of the camera to thereby stabilize the video signal.

BACKGROUND

Cameras can be used to capture a sequence of images to be used as frames of a video signal. Cameras may be fixed to stable objects, for example a camera may be mounted on a stand such as a tripod to thereby keep the camera still while the video frames are captured. However, often cameras may be implemented in mobile devices and are not necessarily mounted to fixed objects, for example a camera may be held, or may be on a moving object such as a vehicle. Movement of the camera while the camera is capturing frames of a video signal may result in unwanted movement in the video signal itself.

Image stabilization is a method that can be used to compensate for the unwanted movement in a video signal. Some systems perform motion estimation in order generate motion vectors for use by an image stabilization process. One such system is described in "Online Video Stabilization Based on Particle Filters" by Junlan Yang et. al. Image stabilization algorithms may consist of three main parts: motion estimation, motion smoothing and motion compensation. A motion estimation block may estimate local motion vectors within the video signal and on the basis of these local estimates calculate a global motion vector. A motion smoothing block may then deal with filtering of the estimated global motion vector in order to smooth the calculated value and prevent large and undesirable differences between motion vectors calculated previously. With stabilization, images are shifted in a motion compensation block so that their motion is equal to the filtered motion. The motion compensation block may take into account sophisticated transformations like rotation, warping or zooming.

It can require large amounts of processing resources to perform image stabilization based on motion vectors as described above. This can be a problem when the video signal is to be stabilized in real time, i.e. when a stabilized version of the video signal is to be used (e.g. transmitted in a video call or output from a device) at the same time as it is being captured by the camera.

SUMMARY

The above referenced-disclosure discusses stabilization of a video signal prior to encoding and transmission.

The inventors have realized that a significant advantage can be gained by effecting video stabilization at the receive side of a communication system.

According to a first aspect of the present invention there is provided a method of stabilizing a video signal, generated by a camera and transmitted as an encoded bit stream, the method comprising:

receiving the encoded bit stream;
decoding from the encoded bit stream a plurality of frames of the video signal;
determining from the encoded bit stream an indication of motion of the camera;
using the motion indication to determine a displacement of the camera between successive frames captured by camera;
using the determined displacement to compensate for motion in the decoded video signal between the successive frames caused by the motion of the camera, to thereby stabilize the decoded video signal.

A second aspect of the invention provides a device for stabilizing a video signal, the device comprising:
an interface configured to receive an encoded bit stream;
a decoder configured to decode from the bit stream a plurality of frames of the video signal;
a displacement determining block configured to use a motion indication received in the bit stream to determine a displacement of the camera between successive frames captured by the camera; and
a motion compensation block configured to use the determined displacement to compensate for motion in the decoded video signal between the successive frames caused by the motion of the camera, to thereby stabilize the decoded video signal.

The indication of motion can be decoded based on the motion vectors. Such embodiments of the invention take advantage of the fact that an encoded bit stream conveying a video signal contains motion vectors which allow frames to be generated at the receive side. These motion vectors are used to encode a video signal for efficiency's sake, to avoid the need to encode each and every frame of the video signal.

As is known in the art, a video signal is encoded with reference frames and motion vectors allowing intermediate frames to be generated from the reference frame and motion vectors.

By stabilizing a video signal at the receive side, using motion vectors complexity can essentially be eliminated. Decoder stabilization has almost no computational complexity as the most expensive step (motion estimation) is removed when re-using the motion vectors already in the bitstream. This can be significantly advantageous in the case where a camera which captures the video signal is intended to be a small, mobile device but where the video signal is transmitted to a user terminal for example in the form of a Net Book, Laptop or Personal Computer with greater processing capability.

Generally a frame is partitioned into blocks, with macroblocks representing a plurality of blocks. A motion vector defines a position of a macroblock in an intermediate frame relative to its position in a reference frame.

Another significant advantage is that embodiments of the invention operate with existing encoded video signals. As embodiments of the invention can use motion vectors which are conventionally used to encode a video signal, a sending side does not need to be aware of stabilization carried out on the received side. Therefore, embodiments of the invention can operate with existing versions of camera software and other video signal generating clients.

The method may further comprise: using a motion sensor associated with the camera to generate a plurality of samples representing motion of the camera; and using the samples to determine a displacement of the camera between a first frame of the video signal and a second frame of the video signal, wherein the determined displacement is used to determine said pixel displacement.

That is, the indication of motion can be determined from samples from a motion sensor associated with the camera which generates a plurality of samples representing motion of the camera. The motion sensor may be a gyroscopic motion sensor. The device may be a mobile device.

The sample rate of the samples generated using the motion sensor may be higher than the frame rate of the video signal. Furthermore, the camera and the motion sensor may be situated within a mobile device.

The using of the determined displacement to compensate for motion in the video signal between successive frames caused by the motion of the camera may comprise: determining a pixel displacement representing motion in the video signal between the first and second frames caused by the determined displacement of the camera; filtering the pixel displacement; and shifting the image of at least one of the first and second frames in accordance with the filtered pixel displacement to thereby stabilize the video signal. The filtering of the pixel displacement may comprise: determining an accumulated pixel displacement based on said determined pixel displacement for the second frame; and determining a filtered accumulated pixel displacement for the second frame based on a weighted sum of the determined accumulated pixel displacement for the second frame and a filtered accumulated pixel displacement for the first frame.

The received frame can follow the first frame. However, a further advantage of carrying out stabilization on the receive side is that the opportunity can be taken of delay which can be applied anyway in a jitter buffer on the receive side or deliberately introduced so that the second frame need not be a subsequent frame following the first one, but can be a frame received earlier and delayed on the receive side.

The method may further comprise adding a time offset to at least one of (i) the captured plurality of frames, and (ii) the generated plurality of samples, such that the timing of the captured plurality of frames matches the timing of the generated plurality of samples.

The method can comprise shifting an image of at least one of the successive frames in accordance with the pixel displacement to thereby stabilize the video signal, wherein the image comprises a stride value indicating memory space of the image, a plurality of pixel values, a pointer indicating the position of a first pixel of the image, and a width value indicating the width of the image, wherein said shifting of the image comprises adjusting the pointer and the width value without adjusting the stride value.

In this way, the image may be shifted and resized by simply changing the pointer and the width value whilst keeping the stride value constant. In this way, no copying of data in memory is necessary. In other words, instead of copying a crop area into a new memory area (which can be a complex process), an image representation is used that allows for independent width and stride values. In this way, a new image can be created by changing the pointer and the width value while the stride is kept intact (which is a simpler process than copying a crop area into a new memory area).

The image may comprise a plurality of image planes which are each represented by a respective plurality of pixel values, a respective pointer indicating the position of a first pixel of the image plane, and a respective width value indicating the width of the image plane, wherein the image planes may be shifted together by adjusting their respective pointers and width values without adjusting the stride value.

The method may further comprise rounding the determined pixel displacement to an integer-pixel displacement.

According to a third aspect of the invention there is provided a computer program product for stabilizing a video signal, the computer program product being embodied on a non-transient computer-readable medium and configured so as when executed on a processor of a device to perform the operations of any of the methods described herein.

BRIEF DESCRIPTION OF THE DRAWINGS

For a better understanding of the present invention and to show how the same may be put into effect, reference will now be made, by way of example, to the following drawings in which.

DETAILED DESCRIPTION

Preferred embodiments of the invention will now be described by way of example only.

Figure 1:
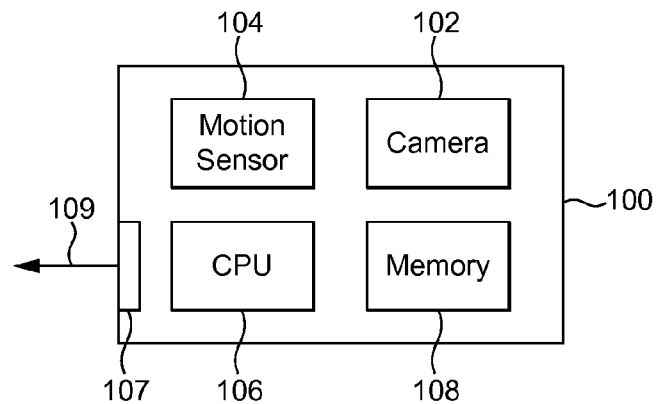
FIG. 1 shows a device according to a preferred embodiment.

FIG. 1 shows a device 100 for generating a video signal. The device 100 may for example be a mobile device such as a mobile telephone or other hand-held device. The device 100 comprises a camera 102, a motion sensor 104, a CPU 106 and a memory 108. The camera 102 is configured to capture images. The captured images may be used to form a video signal, whereby each image is used as a frame of the video signal and the images are captured at the frame rate of the video signal. The frame rate may be, for example, 25 frames per second although the camera may operate at a different frame rate. The minimum frame rate to achieve the perception of a moving image is about fifteen frames per second, but this may depend upon the person viewing the video signal and upon the content that is in the video signal (i.e. how much motion there is in the subject matter of the video signal). The CPU 106 is configured to perform computational processes on the device 100 as is known in the art. The memory 108 is used to store data in the device 100 as is known in the art. The blocks 102, 104, 106 and 108 can communicate with each other by sending data via a bus of the device 100 (not shown in FIG. 1) as is known in the art. In particular, the CPU 106 is responsible for encoding the video frames into a bit stream 109 suitable for transmission from the camera via an interface. The interface can be wired or wireless. In some embodiments, the bit stream 109 can be prepared for transmission in the form of packets to be supplied over a packet-based network to a receiving device for receiving and viewing the video signal. The receiving device is discussed in more detail later.

The camera 102 captures images to be used as frames of a video signal. For example, the camera 102 may have an array of light sensors which record the level of light that is incident on the sensors during the time allocated to a frame of the video signal. A shutter of the camera 102 is used to separate the frames in time, such that during each frame the shutter is open for a period of time and closed for another period of time. The captured frames of video signal are provided to a pre-processor (e.g. implemented in a processing block by the CPU 106). The pre-processor operates to encode the frames of the video signal using a video encoding technique as is known in the art. In such video encoding techniques, an encoded bit stream is generated which includes reference frames and motion vectors which represent the displacement of blocks or macroblocks between a reference frame and an intermediate frame of the video image. The intermediate frame can be an earlier or later frame and may or may not be adjacent. For encoding efficiency, not all frames of the video image are prepared for transmission per use—instead, reference frames are transmitted with motion vectors which allow the intermediate frames to be generated from the reference frame and the motion vectors. A motion vector contains information representative of pixel displacement between frames. Frames can be represented using one or more motion vector: if a frame is divided into blocks or macroblocks, each block or macroblock can be associated with a motion vector.

Figure 2:
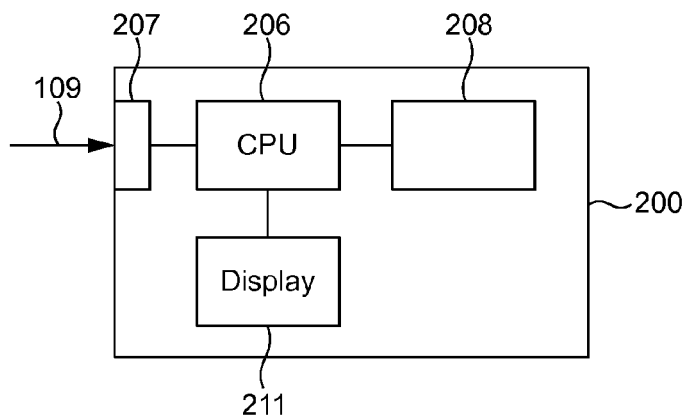
FIG. 2 is a schematic block diagram of a receiver device according to a preferred embodiment.

FIG. 2 is a schematic block diagram of a receiver device. The receiver device comprises an interface 207 for receiving the encoded bit stream 109, a processor 206 for processing the bit stream, and a display 211 for receiving and displaying the decoded bit stream. As with the interface 107, this can interface with any suitable wired or wireless network, which can be packet-based. It can include buffering for receiving successive frames in the video bit stream ready for processing by the CPU 206.

Figure 2A:
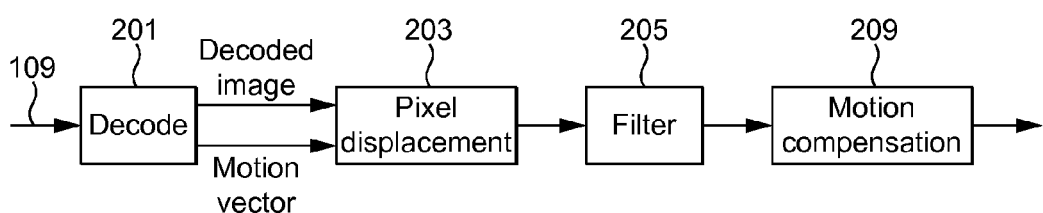
FIG. 2A is a schematic functional block diagram illustrating steps in the decoding process pertaining to stabilization of the video image.

FIG. 2A is a schematic functional block diagram illustrating steps in the decoding process pertaining to stabilization of the video image. It will be readily understood that there can be other steps in the decode process of a video stream as known in the art.

The bit stream 109 is supplied to a decode function 201. The decode function 201 receives reference frames and motion vectors in the bit stream 109 and, using the motion vector to generate the intermediate frames, provides a decoded image which is a sequence of frames representing the frames generated at the time of capture by the camera. This decoded image could be viewed on a display, but in embodiments of the present invention it is first subject to stabilization. The decoded image is supplied with the motion vectors to a pixel displacement function 203 which derives from the motion vectors pixel displacement representing the motion of the camera. It will be appreciated that this pixel displacement can be derived directly, for example as the median of all the motion vectors in the frame. However, using other frame information it could be possible to improve the global motion estimate. For example, to determine areas where motion information is uncertain (e.g. flat areas with some noise typically generates quite random motion vector fields).

The pixel displacement determined by block 203 represents the motion in the images of the frames of the video signal resulting from the motion of the camera 102 (as opposed to motion in the subject matter of the images).

In filter block 205 the pixel displacement is filtered. The filtering will preserve smooth camera motion while removing high frequency motion (shaking) In this way, the motion is smoothed. Then the images are aligned to this smoothed version. Changes applied to the video signal in the image stabilization process are not smoothed as they roughly represent the shaking (but in opposite directions). The filter used to filter the pixel displacement can be designed in different ways, depending on, for example, the resolution of the images captured by the camera 102, the acceptable delay which may be applied to the video signal, and the allowed amount of cropping which can be applied to the images of the original video signal. For example, higher resolution video frames may benefit from a larger filter attenuation of high frequency changes to the pixel displacement applied in the image stabilization process. On the other hand, the amount of cropping sets a hard limit to the maximum filter attenuation.

An exponential filter may be used which filters the pixel displacements according to the equation:

$$x\_\text{filt}(n)=(1-w)*x\_\text{filt}(n-1)+w*x(n),$$

where n represents the frame number of the video signal, x represents the accumulated displacement (or "position"), according to the pixel displacement determined in block 203, and x_filt represents the filtered accumulated displacement which is subsequently used to determine how to align the input image in order to stabilize it as described in more detail below. In this way the filter acts as an exponential filter. When motion stops, x_filt−x will converge to zero which implies no shifting of the image. The filter smoothes out changes to the determined pixel displacement over time, by basing the filtered pixel displacements on the corresponding filtered pixel displacement of the previous frame as well as on the pixel displacement determined for the current frame in block 203. The weighting applied to the filtered pixel displacement of the previous frame is (1−w) whereas the weighting applied to the pixel displacement determined for the current frame is w. Therefore adjusting the weighting parameter, w, will adjust how responsive the filter is to changes in the pixel displacement (x). A recursive (Infinite Impulse Response (IIR)) filter is more suited than a Finite Impulse Response (FIR) filter when the output x_filt is clipped to be in the range [x−crop, x+crop] as the clipped value is fed back to the filter loop and makes subsequent output of x_filt less prone to clipping.

The weighting parameter, w, is adapted to the resolution and instant frame rate of the video signal to obtain a constant physical cut-off frequency, which is measured in Hertz. If the filter were an ideal filter then the physical cut-off frequency would define the highest frequency component of changes to x which will be incorporated into x_filt. Changes to x which have higher frequency than the cut-off frequency will be attenuated by an ideal filter and will not be present in x_filt. However, the filter is not an ideal filter and as such the cut-off frequency defines the highest frequency for which the attenuation applied by the filter is below 3 dB. So for non-ideal filters there will be some attenuation below the cut-off frequency and there will not be perfect attenuation above the cut-off frequency. The filter output is clipped so that that the difference between x_filt and x is not larger than the frame cropping size. w is adapted so that the physical cut-off frequency is constant, e.g. 0.5 Hz. From the filter transfer function, a function w(fc, fs) can be derived that maps a physical cut-off frequency fc to w. When the sampling frequency (frame rate) fs changes, w also changes even though fc is constant. The filter according to the filter equation above is well suited for instant changing of the cut-off frequency (changing w), compared to other filters.

In motion compensation block 209 the image of the second frame (frame 2) is shifted using the filtered pixel displacement from block 205. In this way the motion in the image of the second frame (relative to the first frame) due to the motion of the camera 102 is attenuated. In other words, the filtered pixel displacement is used to compensate for the motion in the video signal between the first and second frames caused by the motion of the camera, to thereby stabilize the video signal.

The filtered pixel displacements are rounded to full-pixel displacements (i.e. integer-pixel displacements). This allows a simple method to be employed to shift the image of the second frame. The image is represented using a stride value indicating memory space of the image, a plurality of pixel values, a pointer indicating the position of a first pixel of the image, and a width value indicating the width of the image. The shifting of the image comprises adjusting the pointer and the width value without adjusting the stride value. It can be seen that the width value is independent of the stride value which allows the width of the image to be changed without affecting the stride of the image. Therefore the memory space of the decoded image (e.g. in the memory 208) does not need to be changed when the image is shifted (and/or resized). This means that no copying of data in the memory 208 is necessary with this approach. This is in contrast to a conventional method of cropping an image in which the crop area of the image is copied into a new memory area. Copying the crop area may be computationally complex which may be detrimental, particularly when the method is to be implemented on a mobile device in which the processing resources available to the CPU 206 may be limited. With the method described herein, since the width value is independent of the stride value the new, shifted image can be created by changing the pointer and the width while the stride is kept intact.

Note that if stabilization is done on sender side, stabilization and cropping is applied before encoding.

If stabilization is done at receiver, cropping must also be done at receiver, thus the pixels that are cropped are in the encoded stream.

The image may be represented by multiple image planes, for example a luma plane (Y) and two chroma planes (U and V). The image planes of the input image may be shifted and resized by simply changing the pointers to the luma and chroma planes, thereby modifying the width of the image planes whilst keeping the stride intact. The image planes are shifted by the same amount to ensure that the shifted image planes can be used together to represent the shifted image.

In order for this image shifting process to be implemented, the image planes require respective pointers, i.e. they cannot all be represented by the same, single pointer. Furthermore, as described above, it is necessary that the image has independent width and stride values.

Figure 3:
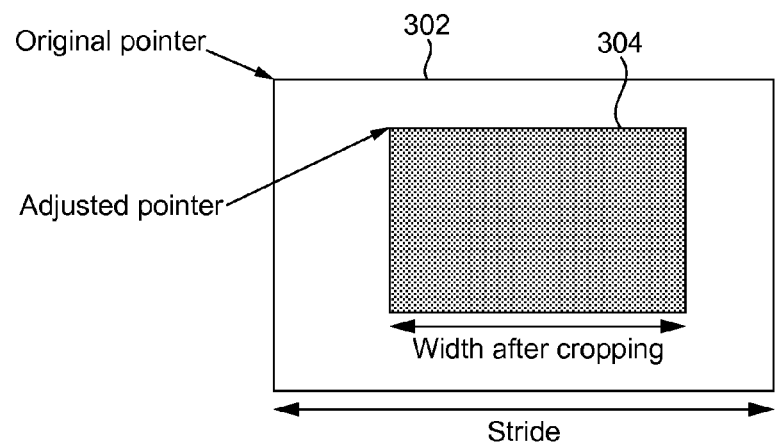
FIG. 3 is a representation of an image before and after a cropping process.

FIG. 3 is a representation of an image before and after a shifting and cropping process. The original image is denoted 302 and the shifted and cropped image is denoted 304. It can be seen that the stride value of the image is left unchanged, whereas the width of the image is reduced. Furthermore, the original pointer points to the top left pixel of the original image whereas the adjusted pointer points to the top left pixel of the shifted and cropped image (which is in a different position to the top left pixel of the original image). In this way the image is shifted and cropped simply be changing the width value and the pointer.

In summary of the method described above, e.g. with reference to FIG. 2A, the following stages are implemented on the receive side to stabilize the images of the frames of the video signal after decoding from an incoming bit stream:
1. a pixel displacement of the image of each frame is derived from motion vectors received in the bit stream;
2. unintended motion in the image of a frame is removed by applying a filter to the sequence of pixel displacements (or to the accumulated pixel displacements as described above); and
3. a stabilized image for a frame is created by shifting the image to the position calculated by the filter. The frame dimensions of the stabilized image for a frame are equal or less than the corresponding dimensions of the original image for the frame. In other words, the stabilized images of the video signal are constructed by cutting out a moving border within the original images of the video signal captured by the camera 102.

In the above described embodiments, pixel displacement for a frame is determined from the motion vectors received in the encoded bit stream. It is also possible to implement embodiments of the present invention by deriving the pixel displacement directly from frames of the decoded image, for example, by comparing each frame with a subsequent frame.

In still further embodiments, an indication of the motion of the camera can be supplied by side information in the encoded bit stream. For example, the side information can include information from a motion sensor (such as 104 in FIG. 1) which is configured to generate samples representing the motion of the device 100 which includes the camera 102.

For example, the motion sensor 104 may be a rotational motion sensor such as a gyroscope. The gyroscope 104 measures angular velocity of the device 100 and outputs samples representing the angular velocity at particular intervals. The intervals may, or may not, be regular intervals. Preferably, but not necessarily, on average the sample rate of the samples output from the gyroscope 104 is higher than the frame rate of the video signal. For example, the sample rate output from the gyroscope 104 may be 60 samples per second, which reflects double the maximum usual shaking frequency of the device 100 and is currently independent of frame rate. The samples generated by the gyroscope 104 are transmitted with the video signal in the bit stream 109.

The angular displacement of the camera 102 between two frames (frame 1 and frame 2) of the video signal can be determined at the receive side. This determination may be performed by a processing block of the CPU 206. The inventors have identified that in order to effectively determine the angular displacement between the two frames using data from the gyroscope 104, it is useful to integrate the angular velocity over the time interval between the midpoints of the exposure times of the frames captured by the camera 102. The inventors have also determined that this can be particularly problematic as it may not be possible to synchronize the sampling rate of the gyroscope 104 with the frame rate of the camera 102, particularly when:
 the camera 102 is arranged to adjust the exposure times in dependence on the available light (which many cameras are);
 the time stamps for the frames of the video signal provided by the camera 102 relate to the times at which the shutter closes (i.e. the end times of the frames, as opposed to the midpoints of the exposure times of the frames); and
 the gyroscope data is not available at the midpoint of the exposure time of the frames.

The pixel displacement function 203 receives decoded video frames and also receives the gyroscope samples. The samples from the gyroscope 104 are provided at a rate at least equivalent to the frame rate of the video signal captured by the camera 102. Using a higher sampling rate in the gyroscope 104 gives more accurate angle estimates but can be more costly in terms of CPU usage.

A time stamp, $t_1$, provided by the camera 102 to a first frame (frame 1) of the video signal indicates the end time of the frame, i.e. the time at which the shutter of the camera 102 is closed to end frame 1. Similarly, a time stamp, $t_2$, provided by the camera 102 to a second frame (frame 2) of the video signal indicates the end time of the frame, i.e. the time at which the shutter of the camera 102 is closed to end frame 2. In order to determine the angular displacement (Δθ) of the device 100 between the first frame and the second frame, rather than using the time stamps of the frames to denote the times of the frames, it is more accurate to use the midpoints of the exposure time of frame 1 and frame 2. The exposure times of the first and second frames are denoted by $e_1$ and $e_2$. The angular displacement is determined by integrating the angular velocity (represented by the samples output from the gyroscope 104) of the device 100 between a time $t_1-0.5\ e_1$ and a time $t_2-0.5\ e_2$. Therefore the angular displacement between frame 1 and frame 2 is given by:

$$\Delta\theta = \theta(t_2) - \theta(t_1) = \int_{t_1-0.5\ e_1}^{t_2-0.5\ e_2} \omega(t)dt$$

The time stamps are transmitted with the encoded frames in the bit stream 109.

Figure 4:
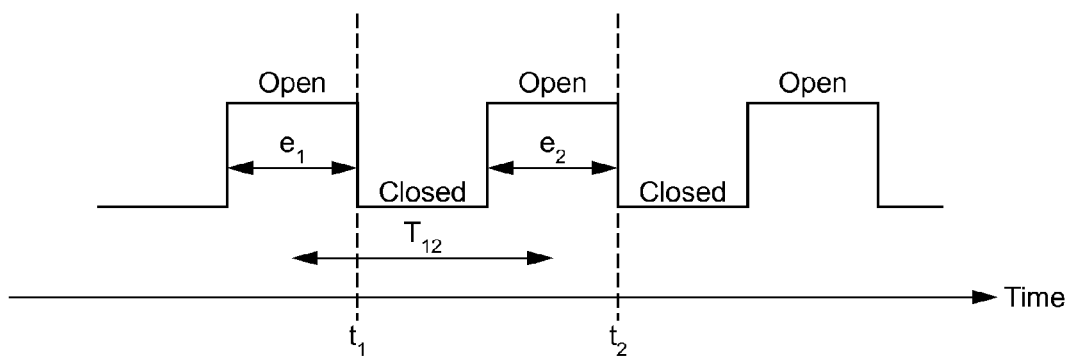
FIG. 4 is an exemplary graphical representation of a shutter position of a camera over time.

FIG. 4 is an exemplary graphical representation of a shutter position of the camera 102 over time. The shutter of the camera 102 closes at time $t_1$ at the end of frame 1. The shutter re-opens again for the camera 102 to capture frame 2 and then closes at time $t_2$ at the end of frame 2. The exposure time of frame 1 is shown as $e_1$ and the exposure time of frame 2 is shown as $e_2$ in FIG. 4. The time over which the angular velocity is integrated is denoted $T_{12}$ in FIG. 4. It can be appreciated from looking at FIG. 4 that integrating over the time $T_{12}$ corresponds to integrating between the midpoint of the exposure time of the first frame (at time $t_1-0.5\ e_1$) and the midpoint of the exposure time of the second frame (at time $t_2-0.5\ e_2$). FIG. 4 shows the open time of the shutter to be equal to the closed time of the shutter, but this is just one example. In some embodiments (implementing short exposure times) the time for which the shutter is open is shorter than the time for which the shutter is closed. In contrast, in other embodiments (implementing long exposure times) the time for which the shutter is open is longer than the time for which the shutter is closed.

Since the samples of the gyroscope 104 are not synchronized with the timings of the frames of the video signal captured by the camera 102, it might be the case that the gyroscope 104 does not generate samples at the midpoints of the frames (frame 1 and frame 2). In which case, the angular velocity of the device 100 at the midpoints of the frames can be determined by interpolating the angular velocity represented by the samples generated by the gyroscope 104. The angular velocity is evaluated by interpolation at any time instant, and the midpoints of the exposure times of the frames define the integral interval used when calculating the angular displacement according to the equation above.

Figure 5:
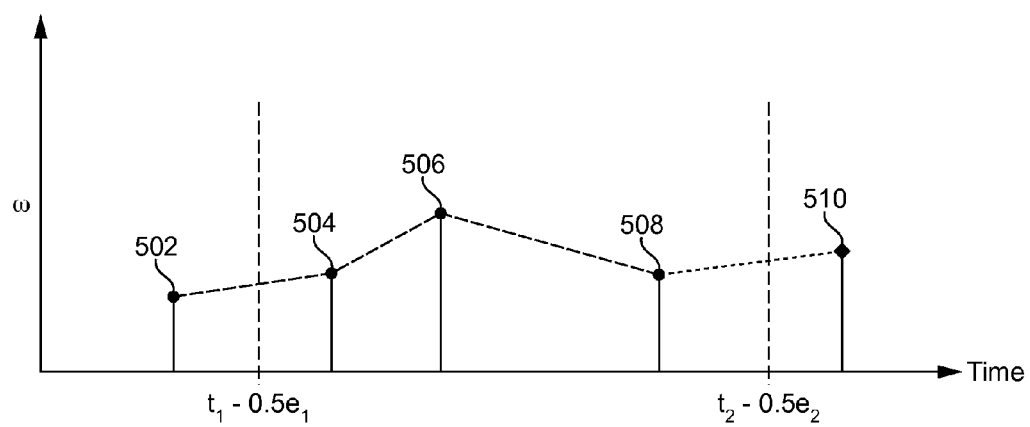
FIG. 5 is an exemplary graphical representation of an angular velocity of a camera over time.

FIG. 5 is an exemplary graphical representation of an angular velocity of the camera 102 over time. The samples representing the angular velocity of the device 100 generated by the gyroscope 104 are shown in FIG. 5 as samples 502, 504, 506, 508 and 510. It can be seen that in the example shown in FIG. 5 the timings of the samples of the gyroscope 104 are not regular. For example, the time between the samples 504 and 506 is shorter than the time between the samples 506 and 508. The dotted line connecting the samples in FIG. 5 shows the value of the angular velocity that can be determined as a function of time by interpolating the angular velocity represented by the samples generated by the gyroscope 104. The interpolated angular velocity (shown by the dotted line) can be integrated between times $(t_1-0.5\ e_1)$ and $(t_2-0.5\ e_2)$ in order to determine the angular displacement of the camera 102 between the first and second frames. FIG. 5 shows a simple linear interpolation between the samples from the gyroscope 104. In other embodiment, more advanced interpolation could be used.

The timings of the operation of the hardware used for the camera 102 and for the gyroscope 104 might not match. This may be because the camera 102 and the gyroscope 104 are implemented in independent hardware chips. Therefore it may be beneficial to add an offset to the time stamps of either (or both) the samples generated by the gyroscope 104 and the frames of the video signal. In this way the timing of the samples from the gyroscope 104 can be matched with the timing of the frames of the video signal correctly. The offset may be constant for a particular combination of hardware chips. Therefore a delay may be computed offline and used at the device 100 without incurring a processing penalty for the method described herein.

In general, a rotation of the camera 102 results in an approximately constant pixel displacement across the image of a frame of the video signal, independent of distances to objects in the image. This is in contrast to linear camera motion, for which pixel displacement is a function of the distance to the object. A function (or algorithm) mapping the rotation of the device 100 to a pixel displacement depends on parameters of the camera 102 (e.g. focal length and width of lens of the camera 102) and the resolution of the images captured by the camera 102.

In some embodiments, the image stabilization may be reduced when motion blur is present in the video signal. When high levels of motion are experienced by the camera 102, motion blur will be present in the video. Therefore, if the image stabilization described herein is applied to the frames of the video signal, then the resulting video signal will contain motion blur but no motion, which a user may perceive as looking unnatural or weird.

In one embodiment no compensation for motion of the camera 102 is made during the time interval when the camera shutter is open (i.e. the exposure times of the frames of the video signal) e.g. in the time interval $[t_1-e_1, t_1]$. If the exposure time is very short (i.e. the shutter is open for a much shorter time than it is closed for) then this will not make a significant difference. However, if the exposure time is very long (i.e. the shutter is open for a much longer time than it is closed for), then little image stabilization will be applied to the video signal. In this way it is ensured that motion blur will always have the corresponding motion in the video signal, which is perceived as looking more natural to a viewer of the video signal.

Determining the motion of the camera 102 from the samples generated by the gyroscope 104 and determining the shutter speed is particularly advantageous since this information can be used to determine whether or not to apply the image stabilization, in view of the motion blur that the video signal may experience, without adding extra computational complexity.

In the embodiments described above, the motion sensor 104 is a gyroscope which generates samples representing the rotational motion of the device 100. In other embodiments, the motion sensor 104 may sense other types of motion, such as translational motion and generate samples representing the translational motion of the device 100. These samples can be used in the same way as described above in relation to the rotational motion to stabilize the video signal. However, as described above, with translational motion the pixel displacement will depend on the distance to the object in the image and so this must be taken into account when determining the pixel displacements. For example, multiple accelerometers may be able to estimate rotational motion, and in this case accelerometers can be used without further modification. For more general translational stabilization, it may become more difficult to implement the method described herein since different areas in the image move by different amounts of pixels. However, if the distance to the object is constant (and known) it may be simple to implement the method with translation motion. Even where the distance to the objects is not constant (but is still known) it would be possible to implement the method with translation motion but extra complication is added in determining the pixel displacements caused by the translation motion of the camera 102.

The functional blocks described in FIG. 2A could be implemented at the device 200 in software or in hardware. For example, the CPU 206 may execute processing blocks to implement the functions. For example, a computer program product for stabilizing a video signal may be provided, which can be stored in the memory 208 and executed by the CPU 206. The computer program product may be embodied on a non-transient computer-readable medium and configured so as when executed on the CPU 206 to perform method steps to implement the function of blocks 203, 205 and 209. Alternatively, hardware blocks may be implemented in the device 200.

Furthermore, while this invention has been particularly shown and described with reference to preferred embodiments, it will be understood to those skilled in the art that various changes in form and detail may be made without departing from the scope of the invention as defined by the appendant claims.

What is claimed is:

1. A method of stabilizing a video signal, the method comprising:
   decoding from an encoded bit stream a plurality of frames of a video signal including a reference frame and one or more motion vectors representing a successive frame captured by a camera;
   generating the successive frame from the reference frame and the one or more motion vectors;
   storing an image of the successive frame in a memory space;
   using the one or more motion vectors to determine a displacement of the camera between the reference frame and the successive frame; and
   using the determined displacement to compensate for motion in the decoded video signal between the reference frame and the successive frame caused by the motion of the camera, to thereby stabilize the decoded video signal, including:
   shifting the image to generate a shifted version of the image by creating an adjusted pointer of the image and an adjusted width value of the image according to the displacement from a region of the image to a corresponding region of the shifted version of the image;
   storing the adjusted pointer and adjusted width value; and
   retrieving the shifted version of the image from the memory space by utilizing the adjusted pointer and the adjusted width value without changing the memory space of the image and without copying data of the image.

2. The method of claim 1, wherein the step of determining a displacement of the camera further comprises receiving samples from a motion sensor associated with the camera and provided in the bit stream.

3. The method of claim 1, wherein said using the determined displacement to compensate for motion in the video signal between the reference frame and the successive frame caused by the motion of the camera further comprises:
   filtering the displacement; and
   shifting the image of the successive frame in accordance with the filtered displacement to thereby stabilize the video signal.

4. The method of claim 3, wherein said filtering the displacement comprises:
   determining an accumulated pixel displacement based on said determined displacement for the successive frame; and
   determining a filtered accumulated pixel displacement for the successive frame based on a weighted sum of the determined accumulated pixel displacement for the successive frame and a filtered accumulated pixel displacement for a previous frame.

5. The method of claim 3 wherein the successive frame is received after a previous frame.

6. The method of claim 3 wherein a previous frame is received after the successive frame, the successive frame having been buffered until the previous frame is received.

7. The method of claim 1, wherein the image comprises a plurality of image planes, each of the plurality of image planes is represented by a respective pointer and a respective width value, and said shifting the image comprises shifting the plurality of image planes together by adjusting the pointer for each respective image plane by the same amount and by adjusting the width value for each respective image plane by the same amount.

8. The method of claim 1, further comprising rounding the determined displacement to an integer-pixel displacement.

9. A system for stabilizing a video signal, the system comprising:
   one or more processors;
   a network receiving module including logic that is executable by the one or more processors to perform operations including receiving an encoded bit stream;
   a decoder module including logic that is executable by the one or more processors to perform operations including decoding from the bit stream a plurality of frames of the video signal including successive frames captured by a camera;
   a memory space configured to store an image of at least one of the successive frames;
   a displacement determining module including logic that is executable by the one or more processors to perform operations including using a motion indication received in the bit stream to determine a displacement of the camera between the successive frames;
   a motion compensation module including logic that is executable by the one or more processors to perform operations including:
   using the determined displacement to compensate for motion in the decoded video signal between the successive frames caused by the motion of the camera, to thereby stabilize the decoded video signal, by shifting the image in accordance with the displacement including adjusting a width value of the image and adjusting a pointer of the image from a region of the image to a corresponding region of a shifted version of the image;
   storing the adjusted pointer and adjusted width value; and
   retrieving the shifted version of the image from the memory space by utilizing the adjusted pointer and the adjusted width value without changing the memory space of the image and without copying data of the image.

10. The system of claim 9, wherein the device system is a mobile device.

11. The system of claim 9, comprising a display configured to display the decoded, stabilized video signal.

12. The system of claim 9, wherein the motion compensation module is further configured to use the determined displacement to compensate for motion in the video signal between the successive frames caused by the motion of the camera by performing operations including:
filtering the displacement; and
shifting the image of at least one of the first and second frames in accordance with the filtered displacement to thereby stabilize the video signal.

13. A memory storing a computer program product that is executable on one or more processors to cause the one or more processors to perform operations comprising:
receiving an encoded bit stream;
decoding from the encoded bit stream a plurality of frames of a video signal including successive frames captured by a camera;
storing an image of at least one of the successive frames in a memory space;
determining from the encoded bit stream an indication of motion of the camera;
using the motion indication to determine a displacement of the camera between the successive frames; and
using the determined displacement to compensate for motion in the decoded video signal between the successive frames caused by the motion of the camera to stabilize the decoded video signal by:
shifting the image to generate a shifted version of the image by creating an adjusted pointer of the image and an adjusted width value of the image according to the displacement from a region of the image to a corresponding region of the shifted version of the image;
storing the adjusted pointer and adjusted width value; and
retrieving the shifted version of the image from the memory space by utilizing the adjusted pointer and the adjusted width value without changing the memory space of the image and without copying data of the image.

14. The memory of claim 13, wherein said determining an indication of motion comprises receiving samples from a motion sensor associated with the camera and provided in the bit stream.

15. The memory of claim 13, wherein the image comprises a plurality of image planes, each of the plurality of image planes is represented by a respective pointer and a respective width value, and said shifting the image comprises shifting the plurality of image planes together by adjusting the pointer for each respective image plane by the same amount and by adjusting the width value for each respective image plane by the same amount.

16. The method of claim 1, wherein:
storing an image of the successive frame in a memory space comprises storing a plurality of pixel values of the image in the memory space and storing a pointer and a width value, the pointer indicating a first pixel of the image and the width value indicating a width of the image and wherein the adjusted pointer is created by adjusting the pointer and the adjusted width value is created by adjusting the width value; and retrieving the shifted version of the image from the memory space by utilizing the adjusted pointer and the adjusted width value comprises retrieving a portion of the stored plurality of pixel values in the memory space, the adjusted pointer indicating a first pixel of the shifted version of the image and the adjusted width value indicating a width of the shifted version of the image.

17. The system of claim 9, wherein:
the memory space is storing a plurality of pixel values of the image; and
retrieving the shifted version of the image from the memory space by utilizing the adjusted pointer and the adjusted width value comprises retrieving a portion of the stored plurality of pixel values in the memory space, the adjusted pointer indicating a first pixel of the shifted version of the image and the adjusted width value indicating a width of the shifted version of the image.

18. The memory of claim 13, wherein:
storing an image of at least one of the successive frames in a memory space comprises storing a plurality of pixel values of the image in the memory space and storing a pointer and a width value, the pointer indicating a first pixel of the image and the width value indicating a width of the image and wherein the adjusted pointer is created by adjusting the pointer and the adjusted width value is created by adjusting the width value; and retrieving the shifted version of the image from the memory space by utilizing the adjusted pointer and the adjusted width value comprises retrieving a portion of the stored plurality of pixel values in the memory space, the adjusted pointer indicating a first pixel of the shifted version of the image and the adjusted width value indicating a width of the shifted version of the image.

19. The method of claim 7, wherein the plurality of image planes comprise a Y luma plane, a U chroma plane, and a V chroma plane.

* * * * *